United States Patent [19]

Masui

[11] Patent Number: 5,936,819
[45] Date of Patent: Aug. 10, 1999

[54] BREAK DISPLAY APPARATUS FOR SEMICONDUCTOR SWITCHING ELEMENT INCORPORATING OVERCURRENT/ OVERHEATING PROTECTION FUNCTION

[75] Inventor: Hideaki Masui, Shizuoka, Japan

[73] Assignee: Yazaki Corporation, Tokyo, Japan

[21] Appl. No.: 09/138,123

[22] Filed: Aug. 24, 1998

Related U.S. Application Data

[63] Continuation of application No. 08/815,531, Mar. 12, 1997, Pat. No. 5,877,929.

[30] Foreign Application Priority Data

Mar. 15, 1996 [JP] Japan ........................................ 8-59273

[51] Int. Cl.$^6$ ...................................................... H02H 3/00
[52] U.S. Cl. ........................ 361/93; 361/103; 340/825.16
[58] Field of Search ............ 340/825.06, 825.16–825.18, 340/525; 361/103, 93, 91, 67, 68

[56] References Cited

U.S. PATENT DOCUMENTS 3,689,887  9/1972  La Falce et al. ........................ 340/163
4,498,075  2/1985  Gaudio ..................................... 340/525

FOREIGN PATENT DOCUMENTS

2-147355  12/1990  Japan ............................. B60R 16/02
3-83133   8/1991   Japan ............................. B60Q 9/00

*Primary Examiner*—Sally C. Medley
*Attorney, Agent, or Firm*—Sughrue, Mion, Zinn, Macpeak & Seas, PLLC

[57] ABSTRACT

A break display apparatus for an intelligent power IC incorporating an overcurrent/overheating protection function. The break display apparatus includes a plurality of intelligent power ICs each incorporating an overcurrent/ overheating protection function of detecting overcurrent/ overheating for a load to break it, a pulse generating unit connected to the plurality of intelligent power ICs for generating a pulse signal having the number of pulses corresponding to a broken intelligent power IC as a signal for specifying the broken intelligent power IC on the basis of a break signal from the broken intelligent power IC, and a warning lamp for indicating the visual information of the broken intelligent power IC in response to the pulse signal generated by the pulse generating unit.

2 Claims, 7 Drawing Sheets

& # x 2 0 ; 
BREAK DISPLAY APPARATUS FOR SEMICONDUCTOR SWITCHING ELEMENT INCORPORATING OVERCURRENT/OVERHEATING PROTECTION FUNCTION

This is a Continuation of application Ser. No. 08/815,531 filed Mar. 12, 1997, now U.S. Pat. No. 5,877,929, the entirety of which is incorporated by reference.

BACKGROUND OF THE INVENTION

1. Field of the Invention

The present invention relates to a break display apparatus for a semiconductor switching element incorporating an overcurrent/overheating protection function for displaying that it has been broken due to overcurrent or overheating.

2. Description of the Related Art

Figure 11:
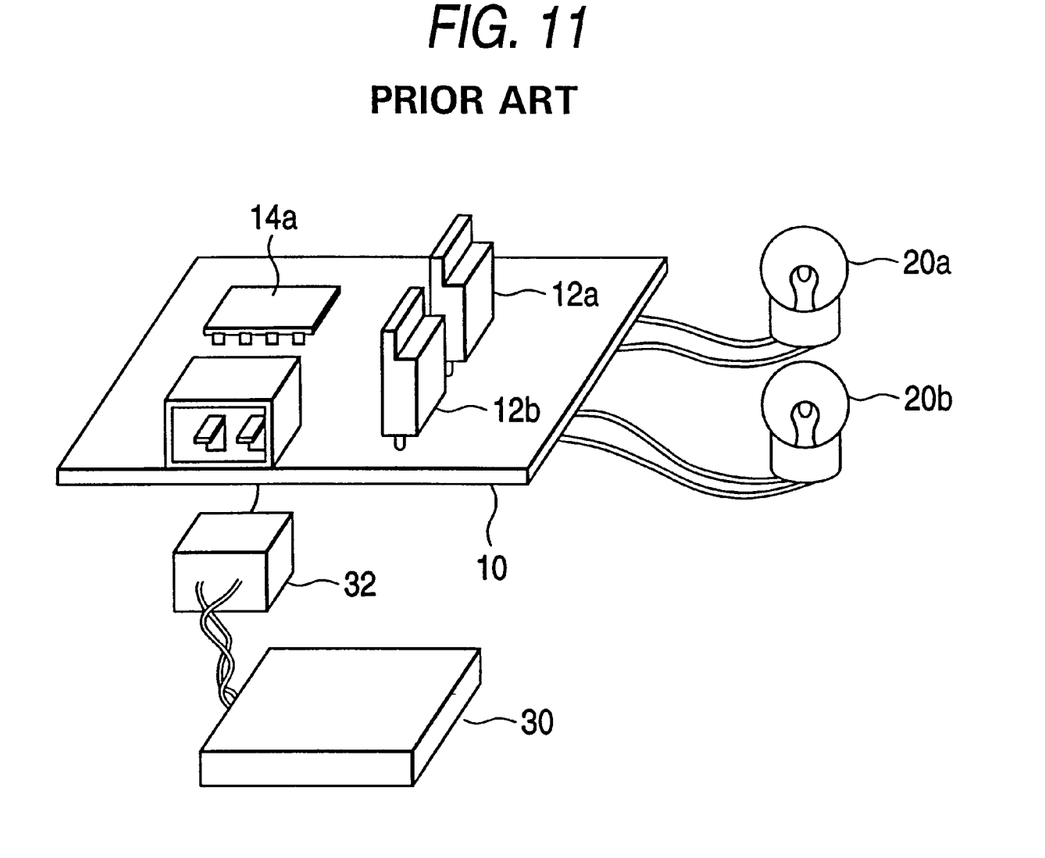
FIG. 11 is a view showing a structure of a conventional semiconductor switching element incorporating an overcurrent/overheating protection function.

A switching element or device incorporating an overcurrent/overheating protection function (hereinafter referred to as "intelligent power IC") generally includes a detection unit and a break unit. In operation, when the detection unit detects overcurrent or overheating for a load, on the basis of a detected signal, the break unit breaks to stop the power supply to the load. Such a previously known intelligent power IC is shown in FIG. 11. As seen from FIG. 11, on a printed circuit board 10 are provided intelligent power ICs 12a and 12b and a control IC 14. Loads 20a and 20b corresponding to the intelligent power ICs 12a and 12b are also provided.

In such a circuit configuration, when either of the intelligent power ICs breaks due to overcurrent or overheating, a diagnosis device 30 is connected to a dedicated connector 32 to decide the cause of break. In this case, communication of information is necessary between the control IC 14 and the diagnosis device 30. Therefore, software is required to effect the communication of information.

However, addition of an intelligent power IC requires to change the software for the control IC 14 and that for the diagnosis device 30. This necessitates a large number of man-hours. Further, excess cost is required to fabricate a simple control system.

On the other hand, known techniques using the above diagnosis device are disclosed in Japanese Utility Model Unexamined Publication Nos. Hei. 2-147355 and Hei. 3-83133. In the technique disclosed in Japanese Utility Model Unexamined Publication No. Hei. 2-147355, a signal from a fault diagnosis device is digital-processed by a fault detecting means to detect the fault, and the signal stored in a storage device is analog-displayed to decide the place of the fault.

In the technique disclosed in Japanese Utility Model Unexamined Publication No. Hei. 3-83133, the presence or absence of fault in various kinds of circuit components is self-diagnosed by an electronic control device. The code signal corresponding to the faulty component detected by the self-diagnosis function of the electronic control device is supplied into a display device and the character signal corresponding to the code signal is outputted on the display device so that the faulty component is displayed by characters on a display area.

However, these known techniques, because of using the diagnosis device, lead to great cost.

SUMMARY OF THE INVENTION

An object of the present invention is to provide a break display apparatus for a semiconductor switching element incorporating an overcurrent/overheating protection function which can reduce the number of man-hours and cost for design.

In order to attain the above object, there is provided a break display apparatus for a semiconductor switching element incorporating an overcurrent/overheating protection function comprising: a plurality of semiconductor switching elements each incorporating an overcurrent/overheating protection function of detecting overcurrent/overheating for a load to break it; a signal generating unit connected to the plurality of semiconductor switching elements for generating a switching element specifying signal for specifying a broken semiconductor switching element on the basis of a break signal from the broken semiconductor switching element; and an indicating unit for indicating visual information of the broken semiconductor switching element in response to the switching element specifying signal generated by the signal generating unit.

DETAILED DESCRIPTION OF THE PREFERRED EMBODIMENTS

Now, referring to the drawings, an explanation will be given of several embodiments of a break display apparatus for a semiconductor switching element incorporating an overcurrent/overheating protection function according to the present invention.

First Embodiment

Figure 1:
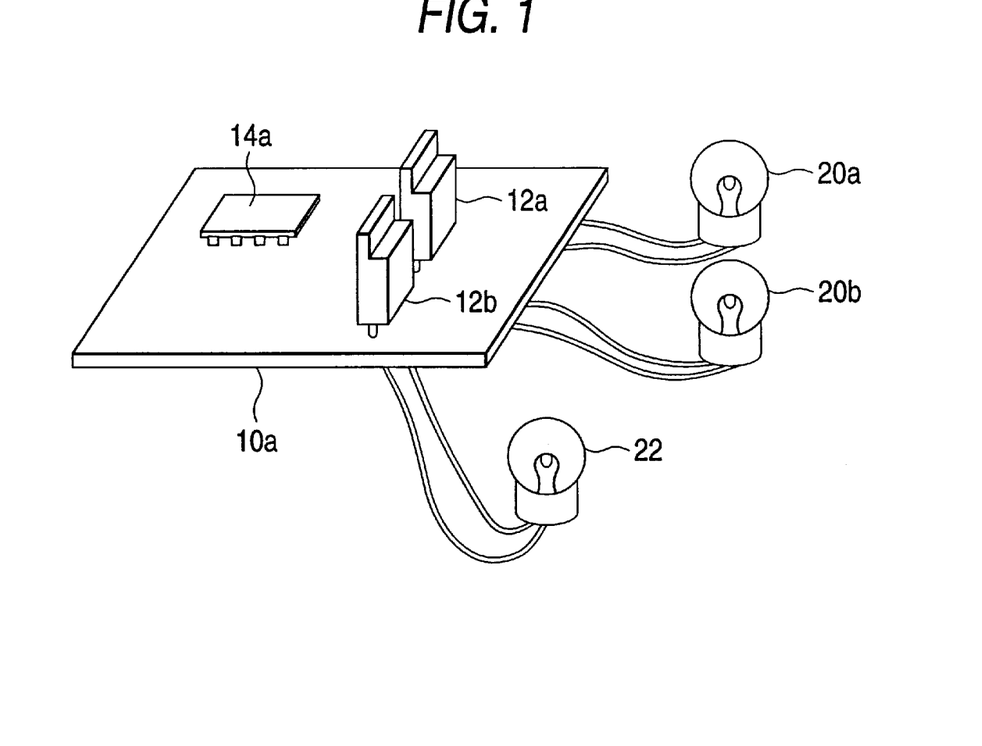
FIG. 1 is a view of a structure of a break display apparatus for a semiconductor switching element incorporating an overcurrent/overheating protection function according to a first embodiment of the present invention.

FIG. 1 is a view of a structure of a break display apparatus for a semiconductor switching element incorporating an overcurrent/overheating protection function according to the first embodiment of the present invention. As seen from FIG. 1, on a printed circuit board 10a are provided intelligent power ICs 12a and 12b and a control IC 14a. A load 20a is connected to the intelligent power IC 12a whereas another load 20b is connected to the intelligent power IC 12b. A warning lamp 22 is connected to the printed circuit board 10a.

Figure 2:
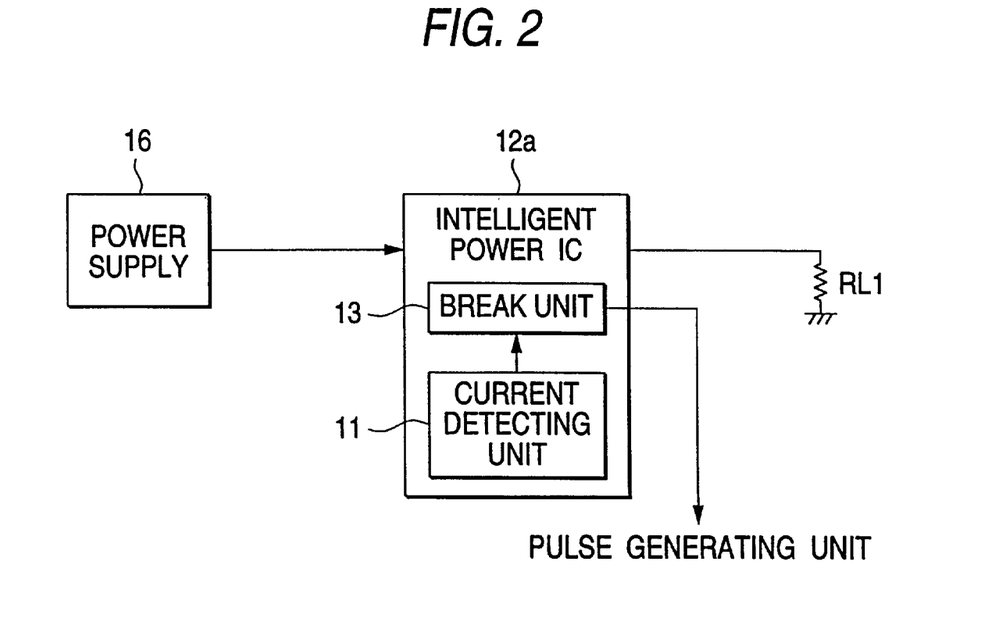
FIG. 2 is a block diagram showing a structure of an intelligent power IC shown in FIG. 1.

FIG. 2 shows the configuration of the intelligent power IC shown in FIG. 1. As seen from FIG. 2, the intelligent power IC 12a supplies the electric power from a power supply 16 to a load resistor RL1. The intelligent power IC 12a includes a current detecting unit 11 for detecting the overcurrent or overheating to the load resistor and a break unit 13. The break unit 13 serves to break a current circuit from the power supply to the load resistor on the basis of the detected signal from the current detecting unit 11 and send out a break signal to a pulse generating unit 40 which will be described later.

The intelligent power IC 12b is structured in the same configuration as the intelligent power IC 12a. The load resistor includes a vehicle tale lamp, a phone, etc.

Figure 3:
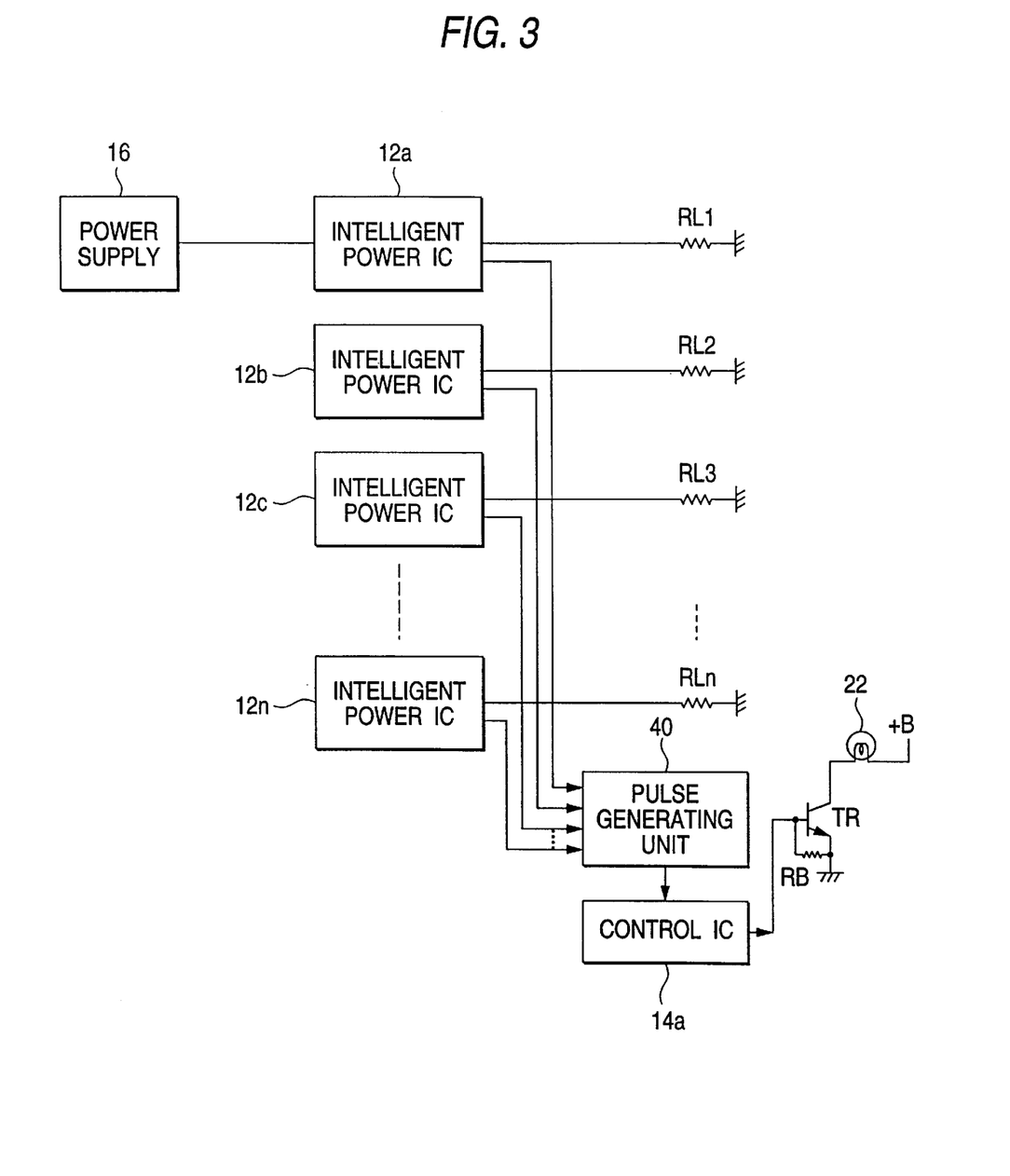
FIG. 3 is a block diagram showing a concrete circuit structure of the first embodiment shown in FIG. 1.

FIG. 3 shows a concrete circuit configuration of the first embodiment shown in FIG. 1. Although only two intelligent power ICs are shown in FIG. 1, it is assumed in FIG. 3 that n number of intelligent power ICs are provided.

In FIG. 3, each of n number of intelligent power ICs 12a–12n has the same configuration as that of the intelligent power IC 12a shown in FIG. 2. A pulse generating unit 40 is connected to the n number of intelligent power ICs 12a–12n.

Figure 4:
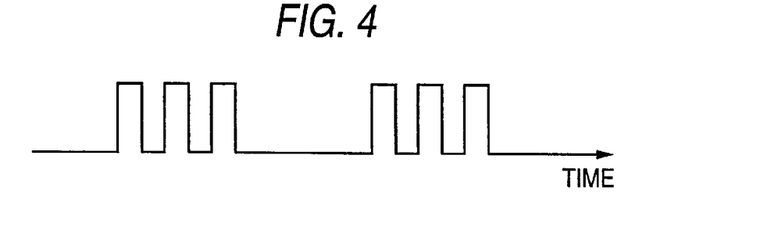
FIG. 4 is a timing chart showing an example of the pulse signal generated in a pulse generating unit.

The pulse generating unit 40 generates a pulse signal having the number of pulses corresponding to a broken intelligent power IC as a signal for specifying the broken intelligent power IC on the basis of a break signal from the broken intelligent power IC. An example of the pulse signal is shown in FIG. 4.

The control IC 14a is connected to the pulse generating unit 40. The control IC 14a stores a pulse signal and supplies the pulse signal to a transistor TR. One end of the warning lamp 22 is connected to the collector of the transistor TR whereas the other end thereof is connected to a power supply B. A bias resistor RB is connected between the base and emitter of the transistor.

Now, an explanation will be given of the operation of the break display apparatus thus configured.

First, when either one of the n number of intelligent power ICs 12a–12n is broken owing to overcurrent or overheating, the break unit 13 in the broken intelligent power IC sends a break signal to the pulse signal generating unit 40.

The pulse generating unit 40 generates a pulse signal having the number of pulses corresponding to the broken intelligent power IC as a signal for specifying the broken intelligent power IC on the basis of the break signal from the broken intelligent power IC. For example, when the intelligent power IC 12c is broken, the pulse generating unit 40 generates a signal having three successive pulses as shown in FIG. 4. When the intelligent power IC 12n is broken, the pulse generating unit 40 generates a signal having n successive pulses.

The pulse signal is sent to the transistor TR through the control IC 14a. If the pulse signal is at "H" level, the transistor TR is turned on to turn on the warning lamp 22. If the pulse signal is at "IL" level, the transistor TR is turned off to turn off the warning lamp 22. In the case shown in FIG. 4, the warning lamp 22 is turned on/off three times.

Thus, without using any specific diagnosis device, with less modification of software, the broken intelligent power IC 12c can be easily specified. Since the broken intelligent power IC of the plurality of intelligent power ICs is specified in a manner of supplying the pulse signal to the single warning lamp 22, the number of circuit components can be greatly reduced. The number of man-hours and cost for design can also be reduced.

In the first embodiment, although the warning lamp 22 is used, a light emitting diode (LED) or 7 (seven)-segment indicator may be used which can also easily specify the broken intelligent power IC.

Second Embodiment

Figure 5:
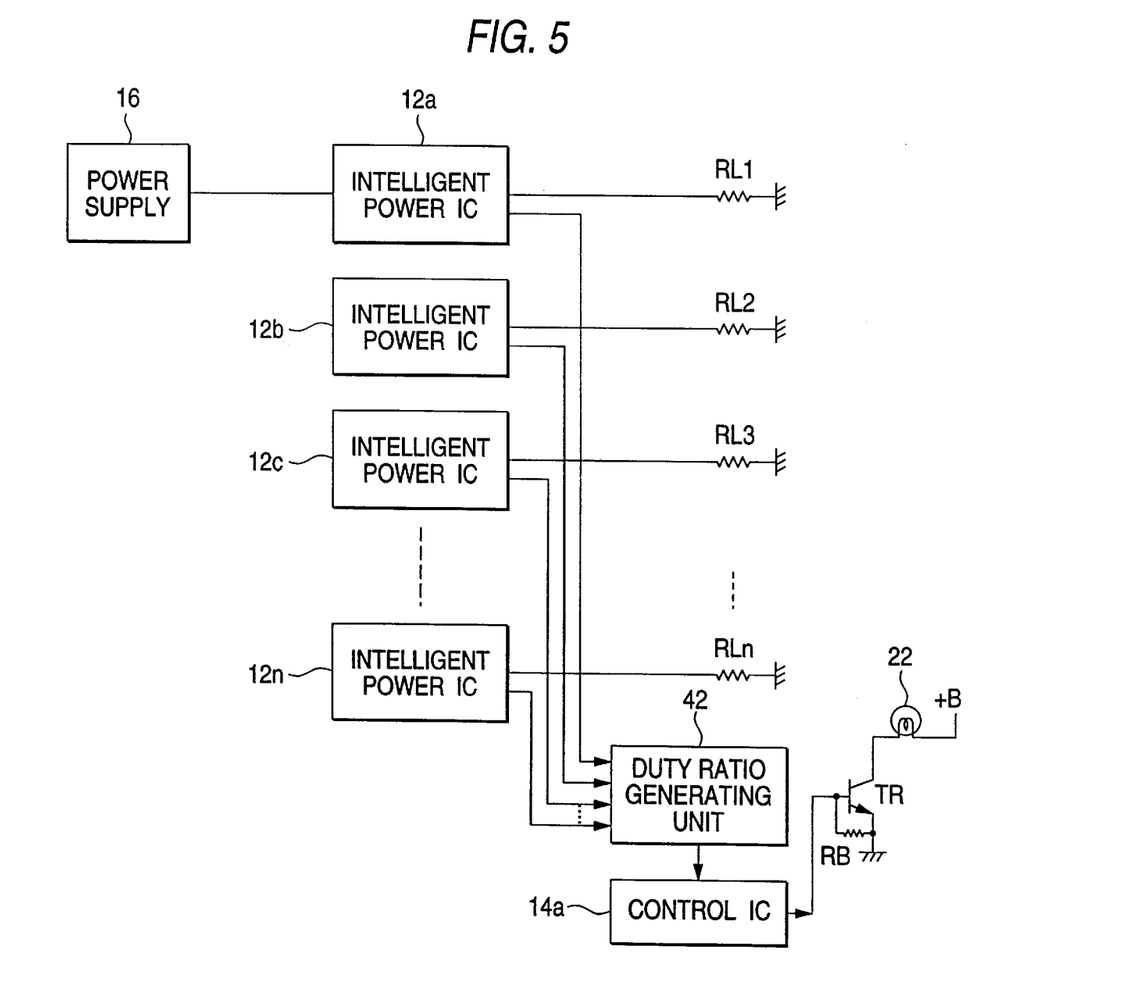
FIG. 5 is a block diagram showing a concrete circuit configuration according to a second embodiment of the present invention.

An explanation will be given of a break display apparatus for a semiconductor switching element incorporating an overcurrent/overheating protection function according to the second embodiment of the present invention. FIG. 5 shows a concrete circuit configuration according to the second embodiment. The second embodiment is different from the first embodiment in that a duty ratio generating unit 42 is provided instead of the pulse generating unit 40.

Figure 6:
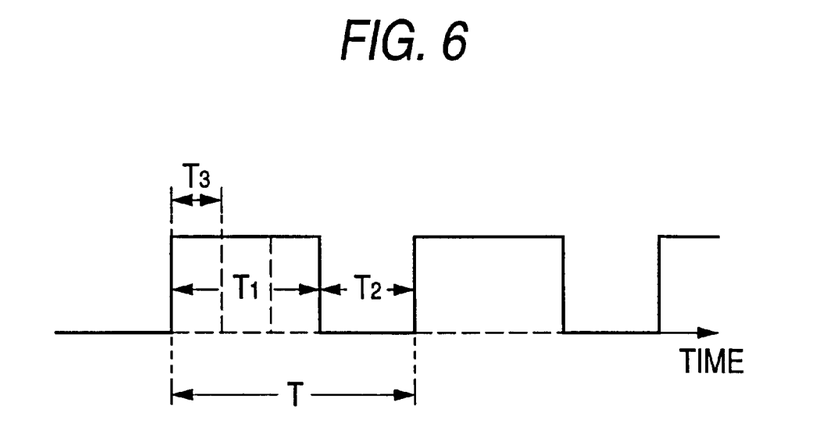
FIG. 6 is a timing chart showing an example of the pulse signal generated in a duty ratio generating unit.

The duty ratio generating unit 42 generates a pulse signal having the duty ratio corresponding to the broken intelligent power IC as a signal for specifying the broken intelligent power IC on the basis of a break signal from the broken intelligent power IC. FIG. 6 shows an example of such a pulse signal. In FIG. 6, the duty ratio represents the ratio of on-pulse time $T_1$ to off-pulse time $T_2$ within period T. For example, a longer on-pulse time $T_1$ is set in accordance with the order of alphabet assigned after the numeral of the intelligent power ICs 12a–12n.

Incidentally, in the second embodiment, the other components, whose like reference numerals refer to like parts in the first embodiment, are not explained here.

Now, an explanation will be given of the operation of the break display apparatus thus configured.

First, when either one of the n number of intelligent power ICs 12a–12n is broken owing to overcurrent or overheating, the break unit 13 in the broken intelligent power IC sends a break signal to the duty ratio generating unit 42.

The duty ratio generating unit 42 generates a pulse signal having the duty ratio corresponding to the broken intelligent power IC as a signal for specifying the broken intelligent power IC on the basis of the break signal from the broken intelligent power IC. For example, when the intelligent power IC 12c is broken, the pulse signal having the on-pulse time $T_1$ three-times as long as that of a reference pulse time $T_3$ as shown in FIG. 6.

The pulse signal is sent to the transistor TR through the control IC 14a. If the pulse signal is at "H" level, the transistor TR is turned on to turn on the warning lamp 22. If the pulse signal is at "L" level, the transistor TR is turned off to turn off the warning lamp 22. In the case shown in FIG. 6, the warning lamp 22 remains "on" during the on-pulse time $T_1$.

Thus, without using any specific diagnosis device, with less modification of software, the broken intelligent power IC 12c can be easily specified. Since the broken intelligent power IC of the plurality of intelligent power ICs is specified in a manner of supplying the pulse signal to the single warning lamp 22, the number of circuit components can be greatly reduced. The number of man-hours and cost for design can also be reduced.

In the second embodiment, although the warning lamp 22 is used, an LED or 7-segment indicator may be used which can also easily specify the broken intelligent power IC. In this case, by indicating on a 7-segment indicator the above order of alphabet in accordance with the length of the on-pulse time $T_1$ by an incremented numeral, a user can easily recognize which power intelligent power IC has been broken.

Third Embodiment

Figure 7:
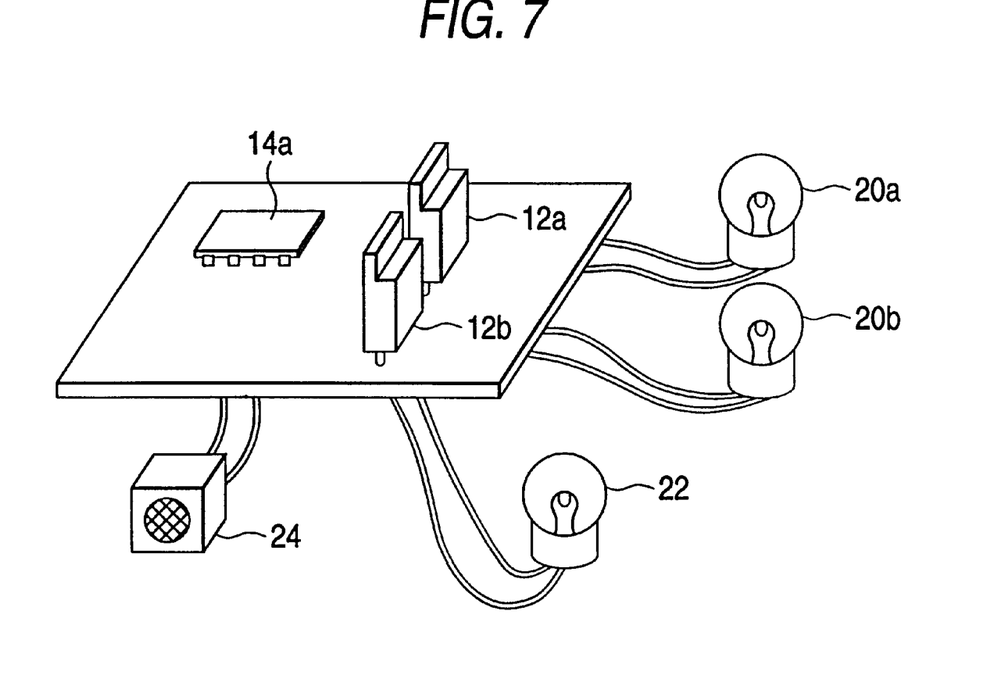
FIG. 7 is a view of a structure of a break display apparatus for a semiconductor switching element incorporating an overcurrent/overheating protection function according to a third embodiment of the present invention.

An explanation will be given of a break display apparatus for a semiconductor switching element incorporating an overcurrent/overheating protection function according to the third embodiment of the present invention. FIG. 7 shows its structure.

Figure 8:
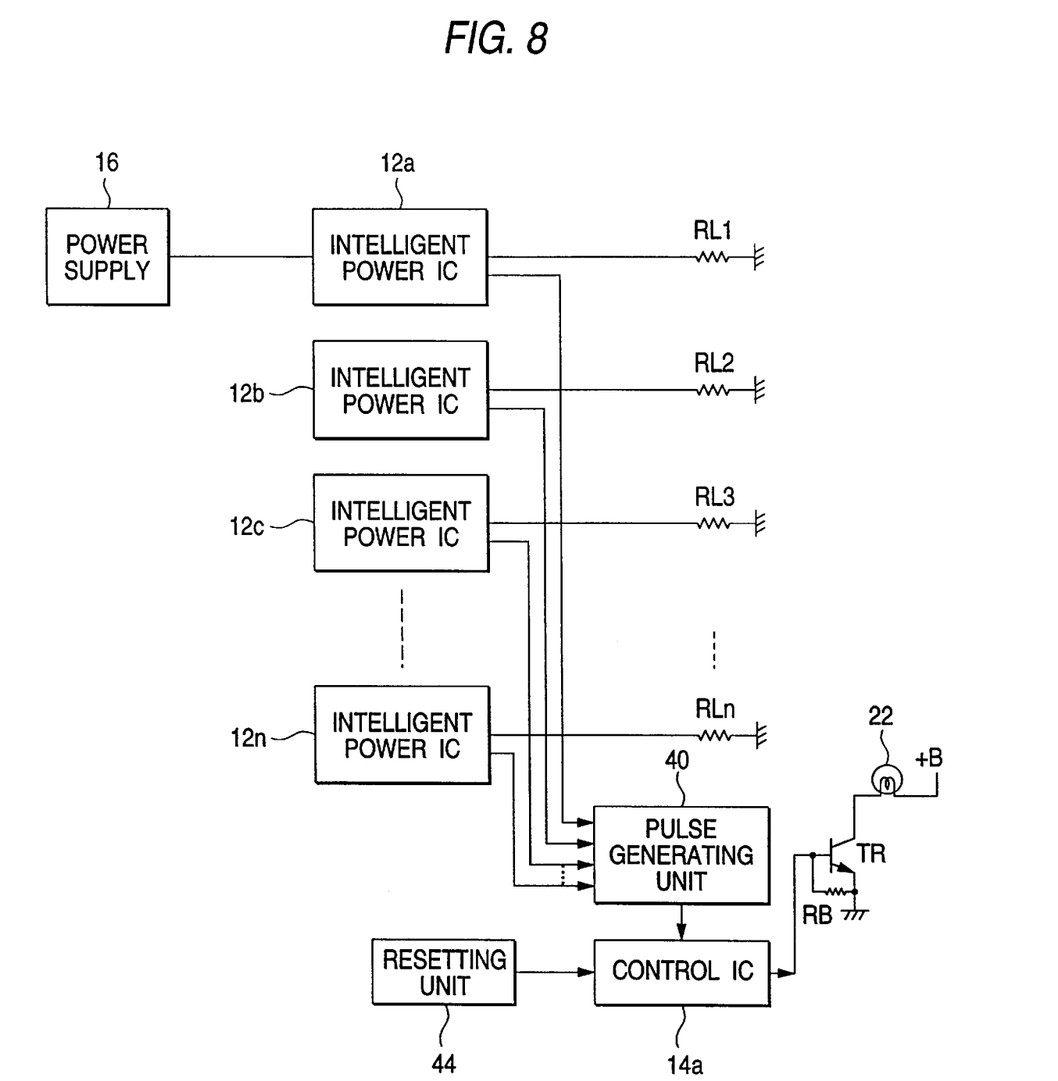
FIG. 8 is a block diagram showing a concrete circuit configuration of the third embodiment shown in FIG. 7.

FIG. 8 shows a concrete circuit configuration according to the third embodiment. The third embodiment is different from the first embodiment in that a resetting unit 44 including a reset switch 24 shown in FIG. 7 is added to the configuration of the first embodiment.

The resetting unit 44 serves to reset the pulse signal stored in the control IC 14a to stop indicating the visual information on the warning lamp 22 of the broken intelligent power IC.

Figure 9:
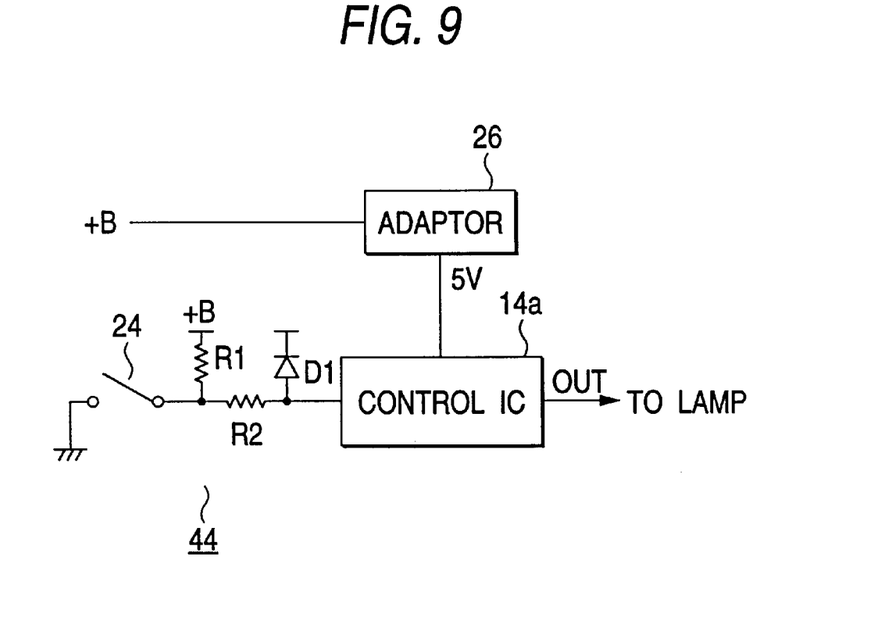
FIG. 9 is a block diagram showing a structure of a resetting unit.

FIG. 9 shows a concrete circuit configuration of the resetting unit 44. The resetting unit 44 includes a reset switch 24, a bias resistors R1, R2 and a diode D1. One end of the reset switch 24 is grounded, whereas the other end thereof is connected between the bias resistors R1 and R2. The bias resistor R1 is connected to a power supply B, and the bias resistor R2 and the anode of the diode D1 are connected to the control IC 14a. A voltage of 5 V is applied to the cathode of the diode D1.

The resetting unit 44 having such a configuration supplies a reset signal to the control IC 14a through the bias resistor R2. Incidentally, an adaptor 26 serves to apply a voltage of 5 V to the control IC 14a.

Figure 10:
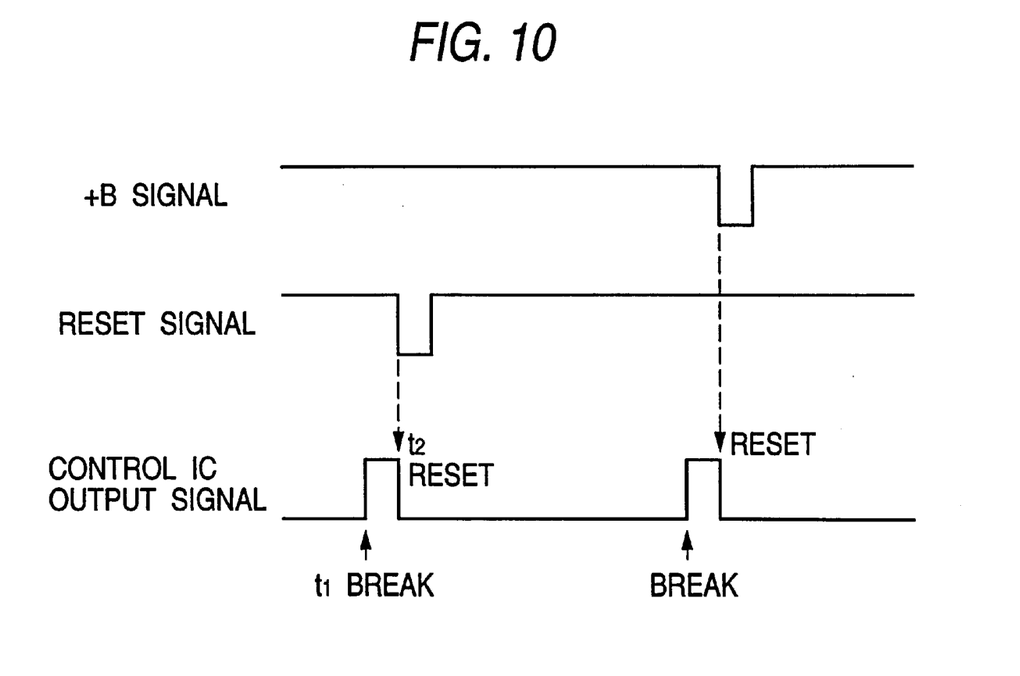
FIG. 10 is a timing chart for explaining the resetting unit.

An explanation will be given of the operation of the third embodiment thus configured with reference to FIG. 10. First, the control IC 14a stores a pulse signal indicative of the broken intelligent power IC supplied from the pulse generating unit 40. When the reset switch 24 is "off", the voltage divided by the bias resistors R1 and R2 is applied to the control IC 14a. As a result, the control IC 14a supplies an output signal to the warning lamp 22 so as to repeat the turning on and turning on/off of the warning lamp 22 from timing $t_1$.

At timing t2, when the reset switch 24 is turned on, the bias resistor R1 is grounded. Namely, a reset signal having 0 V is supplied to the control IC 14a. Thus, the output signal from the control IC 14a is reset at timing t2 to become 0 V. Then, the transistor TR turns off, thus stopping the turning on and turning on/off of the warning lamp 22.

In this way, after the broken intelligent power IC is recognized by the warning lamp 22, it is not necessary to repeat the turning on and turning on/off of the warning lamp 22. For this reason, the turning on and turning on/off of the warning lamp 22 can be stopped by the reset operation.

According to the present invention, without using any specific diagnosis device, with less modification of software, the broken semiconductor switching element can be easily specified. In addition, since the broken semiconductor switching element of the plurality of semiconductor switching elements is specified in a manner of supplying a switching element specifying signal to a single indicating unit, the number of circuit components can be greatly reduced. The number of man-hours and cost for design can also be reduced.

Further, by resetting the switching element specifying signal, indication of the visual information on the broken semiconductor switching element can be stopped.

What is claimed is:

1. A break display apparatus for a semiconductor switching element incorporating an overcurrent/overheating protection function comprising:

a plurality of semiconductor switching elements each incorporating an overcurrent/overheating protection function of detecting overcurrent/overheating for a load to break it;

a signal generating unit connected to said plurality of semiconductor switching elements for generating a switching element specifying signal for specifying a broken semiconductor switching element on the basis of a break signal from the broken semiconductor switching element, wherein said signal generating unit is a pulse generating unit for generating a pulse signal having a number of pulses corresponding to a numerical designator associated with the broken semiconductor switching element as the switching element specifying signal; and an indicating unit for indicating visual information of the broken semiconductor switching element in response to the switching element specifying signal generated by said signal generating unit.

2. The break display apparatus according to claim 1, further comprising a storage unit for storing the pulse signal generated in said pulse generating unit, and a resetting unit for resetting the pulse signal stored in said storage unit to stop indicating the visual information of the broken semiconductor switching element on said indicating unit.

* * * * *